United States Patent [19]
Leonhardt

[11] 4,001,152
[45] Jan. 4, 1977

[54] FLAMMABLE THERMOPLASTIC CEMENT
[76] Inventor: Horst M. Leonhardt, 6-"I" Green Knoll Circle, Brockton, Mass. 02402
[22] Filed: Nov. 13, 1972
[21] Appl. No.: 306,326

Related U.S. Application Data
[63] Continuation-in-part of Ser. No. 37,152, May 14, 1970, abandoned.

[52] U.S. Cl. .................................. 260/18 N; 44/6; 44/7 R; 44/7.5; 260/32.6 N; 126/263; 432/1; 401/1; 428/395; 431/288
[51] Int. Cl.² .......................................... C08J 3/20
[58] Field of Search ........................ 263/1; 161/175; 126/263; 431/288; 260/18 N, 32.6 N; 44/6, 7, 7.5; 401/1

[56] References Cited
UNITED STATES PATENTS

| 1,593,058 | 7/1926 | Bornand | 161/175 |
| 2,604,389 | 7/1952 | Berdick | 44/6 |
| 2,854,321 | 9/1958 | Stanton | 44/6 |
| 3,322,518 | 5/1967 | Hammerton | 44/7 |
| 3,400,038 | 9/1968 | Burgess | 161/50 |

OTHER PUBLICATIONS
"Handbook of Adhesives" by Irving Skeist, Rheinhold Publishing, London (1962) pp. 448–449.

Primary Examiner—Eugene C. Rzucidlo
Attorney, Agent, or Firm—Robert L. Goldberg

[57] ABSTRACT
A hot melt adhesive formulation comprising a thermoplastic in intimate admixture with a fuel. The hot melt adhesive formulation is molded into a convenient shape such as a rod, and upon ignition with an open flame, the fuel of the adhesive formulation undergoes a slow but sustained, burning, resulting in melting and dripping of the adhesive. Thus, a rod for example may be held at one end, ignited at the other end, and used to apply a smooth bead or puddle of adhesive without using a brush, gun applicator, or other means known to the art. The bead, because of the intimate admixtue of the fuel and the thermoplastic resin, continues to burn thereby remaining tacky for an extended time. This permits sufficient time to complete an assembly of parts and repositioning of the parts, if necessary.

10 Claims, 3 Drawing Figures

FLAMMABLE THERMOPLASTIC CEMENT

CROSS-REFERENCE TO RELATED APPLICATIONS

This application is a continuation-in-part of copending U.S. Pat. Application Ser. No. 37,152 filed May 14, 1970, now abandoned.

BACKGROUND OF THE INVENTION

1. Introduction

This invention relates to hot melt adhesives and more particularly, to hot melt adhesive formulations in combination with a fuel capable of undergoing sustained burning when ignited.

2. Description of the Prior Art

The term "hot melt" is quite well known in the art and refers to bonding agents which achieve a solid state and resulting strength by cooling, as contrasted with other adhesives which achieve the solid state through evaporation, by removal of solvents, or by cross-linking. When cold, hot melt adhesives are thermoplastic solid materials. Application of heat brings the hot melt adhesives to a liquid, tacky state and after removal of the heat, the adhesive sets by simple cooling. Hot melt adhesives provide almost instantaneous bonding together with a high degree of wetting. Typical early hot melt adhesives are based upon rosin and its derivatives; alkyds; terpene resins and heat-stable phenol-formaldehyde resins and the like. Current hot melt adhesives are based upon various polyamines and polyamides. All of the foregoing are frequently modified with higher molecular weight polymers such as ethyl-cellulose, polyvinylacetate and its derivatives, butylmethyl-acrylates, polyethylene, polystryene and styrene copolymers and polyisobutylene. Commercial examples of such hot melt adhesive formulations include olefin polymer or copolymer-based adhesives sold by Borden Chemical Company under the trade designation MA-5423, MA-5428 and HM-109-34; modified polyethylene based adhesives sold by the Eastman Chemical Company under the trade designations Epeline C-17, Eastobond L-808/91 and Eastobond L-8080/38 and by the H. B. Fuller Company under the trade designation HM 131-R, HM 212 R and HM 065 R; and by the General Mills Corporation under the trade designation Versalon 1010, 1055 and the like. Hot melt formulations are disclosed in U.S. Pat. Nos. 2,153,660; 2,886,543; 3,242,141; 3,377,303; and 3,400,038; all incorporated herein by reference.

Hot melt adhesives are typically used in the melt by heating the adhesive in a vessel and applying the same by brushing the adhesive onto the workpiece. It is recognized in the art that this is not a fully satisfactory method for applying a hot melt adhesive, especially with small scale applications such as for home use, since it involves the use of a pot or other vessel for heating the adhesive which is difficult to clean and a soft brush for each application. As a result, an improved means for applying hot melt adhesives have been developed whereby an applicator gun is filled with the adhesive in solid form. The application gun has heating means and a nozzle so that the adhesive is heated to a viscous liquid form and squeezed out of the nozzle in the desired form of a smooth, liquid bead. Such an applicator gun is expensive for home use and requires frequent cleaning to unclog its nozzle. Moreover, upon application of a bead of the adhesive, the bead cools rapidly loosing its tacky state. Thus, to adhere an assembly of parts, there is little time to place the parts together and it is difficult to reposition the parts once assembled.

STATEMENT OF THE INVENTION

The present invention provides an improved hot melt adhesive formulation which does not require accessory equipment for application such as the aforesaid applicator gun and which remains tacky for an extended time. The formulation comprises a thermoplastic hot melt adhesive in combination with a fuel capable of undergoing a sustained exothermic chemical reaction upon ignition with an open flame. The hot melt adhesive formulation may be in any convenient shape, such as a rod. In use, one end of a rod, for example, may be held in the hand while the other end is ignited with a match. The fuel in combination with the resin in the form of the molded rod slowly burns, melting the adhesive, which becomes fluid so that it may be applied to a desired surface.

DESCRIPTION OF THE DRAWINGS

In the drawings:

FIG. 4 is a plan view of a sandwich structure of two surfaces adhered together with a layer of the hot melt adhesive with a section of the upper surface removed for purposes of illustration.

DESCRIPTION OF THE PREFERRED EMBODIMENTS

The thermoplastic resin used as the adhesive of the hot melt adhesive formulation is not critical, the invention being broadly applicable to substantially all prior art hot thermoplastic melt adhesives that will not completely decompose upon brief contact with a flame. Accordingly, those examples of thermoplastic resins used in hot melt adhesive formulations set forth above are referenced herein as representative illustrative examples of suitable materials.

Figure 1:
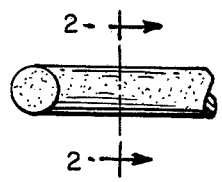
FIG. 1 represents the hot melt adhesive formulation of the invention in the form of a rod in accordance with one embodiment of the invention.

Hot melt adhesives are prepared in accordance with FIG. 1 of the drawings by admixing a major portion of a suitable thermoplastic resin in powder, particulate, granular or like form with a minor amount of a liquid or particlate solid fuel and molding or extruding the admixture to a desired shape. The result is a fairly homogeneous mixture which may even be a solid solution depending upon the materials used, fabrication temperature and the like.

The fuel is a material that is capable of causing the molded hot melt adhesive formulation to undergo a slow, sustained burning when ignited with an open flame. Thus, for purposes of this invention, the fuel is defined as a material which undergoes a sustained, exothermic chemical reaction when dispersed in a molded thermoplastic article and ignited with an open flame. It should be obvious that many materials are capable of serving as a fuel in accordance with the invention, representative examples of suitable materials including acetamide, acetanilide, acetophenone, benzalacetone, benzamide, benzidine, n-butyramide, camphene, dibenzylamine, dihydronaphthalene, dinitrotoluene, diphenylamine, diphenylmethane, formamide, glycogen, hexadecane, hexamethylenetetramine, isobutyramide, naphthalene, naphthylamine, o-nitraniline, o-nitrophenol, p-nitrotoluene, phenanthrene, phenylenediamine, phthalamide, tetraphenylmethane, triaminotriphenyl carbinol, tribenzyl amine, triphenyl amine and triphenyl carbinol.

The proportions or ratio of thermoplastic resin adhesive in combination with the fuel is not critical and is dependent upon the flammability characteristics of the fuel. Generally, the fuel is added in an amount sufficient to provide a slow sustained burning rate for the molded hot melt adhesive formulation, preferably a burning rate of from ¼ to 30 linear inches per minute dependent upon the amount of fuel and the manner of use, and preferably from ½ to 10 linear inches per minute. In general, the thermoplastic resin is in major amount and the fuel in minor amount. A preferred range for this fuel is from 1 to 50 percent by weight and most preferably, from about 15 to 35 percent by weight of the total composition.

Additives in addition to the fuel and thermoplastic resin be added to the formulation in accordance with art recognized procedures. For example, stabilizers, pigments, plasticizers and the like may be added if desired.

Figure 2:
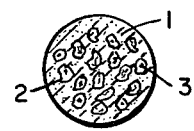
FIG. 2 is a cross-section view of the rod of FIG. 1 taken across hatch line 2—2.

The preferred resins for forming the hot melt adhesive formulation in accordance with the invention are the amine and the amide type hot melt adhesives as exemplified in the aforesaid U.S. Pat. Nos. 3,242,141 and 3,377,303, and the preferred fuels are the organoamine compounds, especially aliphatic and aromatic amines containing only carbon, nitrogen and hydrogen atoms in the molecule. The amine fuels provide a sustained rate of burning which is somewhat regulated due to the nitrogen atom in the molecule. Solid fuels are most preferred and most preferably those solid fuels which sublime or go directly to the vapor state upon heating. When such a fuel is used, the heat applied in a molding operation causes some of the particulate fuel to vaporize forming a pore or pocket in the molded hot melt adhesive formulation. This is desirable as it enhances burning. Such an embodiment is illustrated in FIG. 2 of the drawings which is a cross-sectional view taken along hatch line 2—2 of FIG. 1 wherein there is shown the hot melt adhesive 1 having pores or pockets 2 containing particles of fuel 3.

The admixture of the fuel and the resin as described above provides a desirable and unexpected result. As the adhesive burns and drips, there is carried with the adhesive a residuum of the fuel which continues to combust. Consequently, as a bead of the adhesive is applied to a surface, it remains tacky for a time sufficient to complete an assembly and reposition the same as necessary. This is in contrast to conventional hot melt adhesives applied with a gun applicator where the adhesive begins to harden immediately upon application requiring rapid assembly of the parts without opportunity for repositioning.

Figure 3:
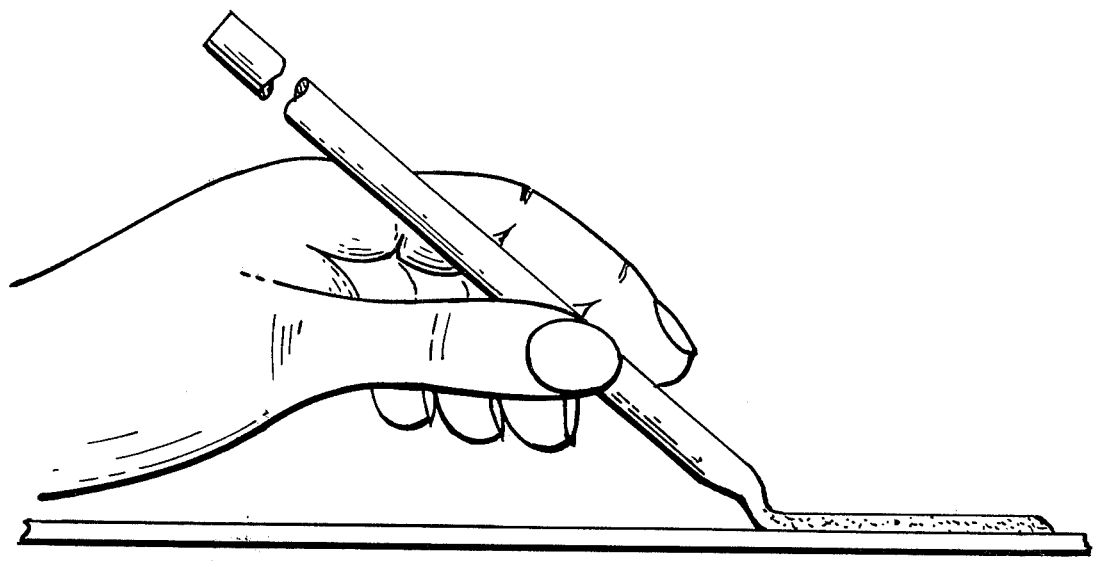
FIG. 3 represents the hot melt adhesive formulation of the invention in the form of a molded rod used to apply a bead of adhesive to a substrate.

Use of the hot melt adhesive formulation is illustrated in FIG. 3 of the drawings where the formulation has been molded to a shape such as an elongated rod. One end of the rod may have a handle, preferably inflammable to protect the user, if desired (not illustrated in the drawing). In use, one end of the rod is ignited with an open flame and the burning of the fuel within the formulation causes the thermoplastic resin to melt. Thus, a bead of molten adhesive is applied to a substrate which is then available for use. As described above, the bead retains its molten state for a sustained period of time longer than expected due to a residuum of fuel retained in the molten bead which continues to burn until fully consumed. This maintains the adhesive tacky. After applying the bead to the desired substrate, the burning hot melt adhesive rod may be extinguished by simply blowing on the burning end in a manner analogous to putting out a burning match or by contacting the ignited end with a surface and twisting the rod while applying pressure.

The hot melt adhesive formulation is readily molded to any desired shape using conventional procedures known in the art. In one embodiment, where a rod or elongated shape is desired, simple extrusion at a temperature substantially at the melting point of the thermoplastic may be used. Alternatively, a desired shape may be molded using conventional cold or hot molding techniques. Temperatures and pressures are of course dependent upon the materials used, and in general, the conditions heretofore used for forming thermoplastic hot melt adhesives are applicable to formulations comprising the thermoplastic and fuel of this invention.

The invention will be better understood by reference to the following example set forth for purposes of illustration only.

A Versalon polyamide resin No. 1175 was admixed with hexamethylenetetramine as a fuel. The ratio of polyamide to fuel was about 3:1. The two materials were mixed together by melting the polyamide and mixing the fuel in power form, with the molten polyamide. While still molten, the mixture was shaped into the form of a rod which hardened into a coherent rod.

The cross-section of a so-formed rod was examined and found to contain minute pores believed to be formed by the fuel subliming during the molding operation forming pockets which contain particulates of fuel which condenses therein and act to enhance burning.

The so-formed rod measured about 15 inches in length and about 3/16 inch in diameter. One end of the rod was ignited with a match and the rod was observed to burn slowly with a pale blue flame. The polyamide dripped onto the surface of a substrate forming a continuous molten bead. The bead remained molten for approximately one minute after being applied. While molten, it could be observed that the bead evolved gas thus indicating a residuum of fuel in the applied hot melt adhesive. A surface was adhered to the substrate and after cooling, could not be separated therefrom.

I claim:
1. A self-heating hot melt formulation capable of being applied without auxiliary equipment consisting essentially of an organic thermoplastic synthetic resin hot melt adhesive intimately admixed with a lesser portion by weight of fuel capable of undergoing a sustained burning upon ignition, said fuel being in such an amount that a molded shape formed from said combination of hot melt adhesive and fuel upon being ignited at one end will slowly undergo said burning causing the hot melt adhesive to melt and drip forming a deposit of molten adhesive containing a residuum of fuel which continues to undergo said burning maintaining said adhesive molten until said fuel is consummed.

2. The hot melt adhesive formulation of claim 1 where said hot melt adhesive is selected from the group consisting of polyamines and polyamides.

3. The hot melt adhesive formulation of claim 2 where the fuel is present in an amount such that the burning rate of a shape molded from said formulation will burn between about ¼ and 10 linear inches per minute.

4. The hot melt adhesive formulation of claim 2 where the fuel is present in an amount from about 1 to 50 per cent by weight of the formulation.

5. The hot melt adhesive formulation of claim 2 where the fuel is present in an amount of from about 15 to 35 per cent by weight of the formulation.

6. The hot melt adhesive formulation of claim 2 molded into an elongated shape.

7. The hot melt adhesive formulation of claim 6 where the elongated shape is a rod.

8. The hot melt adhesive formulation of claim 7 where the rod has a handle at one end that is not flammable.

9. The hot melt adhesive formulation of claim 2 where the fuel is an organic aliphatic or aromatic amine.

10. The hot melt adhesive formulation of claim 2 where the fuel is hexamethylenetetramine.

* * * * *